United States Patent

Kobayashi

Patent Number: 5,684,543
Date of Patent: Nov. 4, 1997

[54] INPUT AND OUTPUT SIGNAL CONVERTER WITH SMALL-SIZED CONNECTION CROSSPOINT

[75] Inventor: Yuji Kobayashi, Kanagawa, Japan

[73] Assignee: Sony Corporation, Tokyo, Japan

[21] Appl. No.: 405,156

[22] Filed: Mar. 16, 1995

[30] Foreign Application Priority Data

Mar. 18, 1994 [JP] Japan .................................. 6-074112

[51] Int. Cl.⁶ ........................................... H04N 5/265
[52] U.S. Cl. .............................. 348/705; 348/722
[58] Field of Search .............................. 348/705, 578, 348/706, 594, 592, 659, 708, 587, 722; H04N 5/268

[56] References Cited

U.S. PATENT DOCUMENTS

| | | | |
|---|---|---|---|
| 4,694,343 | 9/1987 | Flora | 348/705 |
| 4,694,344 | 9/1987 | Flora | 348/705 |
| 4,858,017 | 8/1989 | Jackson et al. | 348/722 |

*Primary Examiner*—Victor R. Kostak
*Attorney, Agent, or Firm*—William S. Frommer; Alvin Sinderbrand

[57] ABSTRACT

The input and output signal converter with a simple construction selects a voluntary internal video signal out of a plurality of internal video signals generated at an image processing unit for external output in addition to outputting a normal video signal. A selection unit 8 selects a plurality of internal video signals S7 generated at the image processing unit 3 and/or a plurality of external image input signals S1. A small-sized selection unit 15, which receives a plurality of internal video signals S7, selects the voluntary internal video signal S7 for output. With this invention, the voluntary video signal S7 can be selected out of the plurality of internal video signals S7 for output with a simple construction. Thus, the invention does not need to resort to a large number of switches which would, otherwise, require that the plurality of external input video signals S1 be selected in the first selection unit 2.

2 Claims, 4 Drawing Sheets

INPUT AND OUTPUT SIGNAL CONVERTER WITH SMALL-SIZED CONNECTION CROSSPOINT

BACKGROUND OF THE INVENTION

1. Field of the Invention

The present invention relates to an input and output signal converter, and is applicable to an input and output signal converter for outputting video data processed by digital mixer to a plurality of external channels such as monitors and video tape recorders.

2. Description of the Related Art

Conventionally, an input and output signal converter outputs program data generated by processing first video data of a plurality channels input from the outsides and its preview data to a plurality of outside channels.

FIG. 1 shows a switcher 1. Dozens of channels of first video data S1 are input from a plurality of video cameras and video tape recorders (hereinafter referred to as "VTR") (not shown) and the like to a selection unit (hereinafter referred to as "crosspoint") 2 via first input bus 11. An image processing unit (hereinafter referred to as "effects unit") 3 processes a plurality of first video data S2 selected in the crosspoint 2 out of the first video data S1 with mixing and simple special effects to output said plurality of first video data S2 as edited program data S3 by three channels. This program data S3 is output to the outsides via an output circuit 5 of the output unit 4 as program data S4.

In each type of video data created in the effects unit 3 other than the program data S3, the edition preview data S5 is output to the outsides as edition preview data S6 via an exclusive edition preview output circuit 6. In the same manner, when it is necessary to output other video data created in the effects unit 3 such as chroma key data and preview data of downstream keyer (not shown), the switcher 1 is provided with an exclusive output circuit and output terminal for each video data.

However, as described above, when the exclusive output circuit and the output terminal are arranged for outputting each type of video data generated in the effects unit 3, there is a problem of the enlargement of the construction of the switcher 1. The system and the usage thereof are different from each user. Thus, all of the output circuit and the output terminal for each type of video data are rarely used. In addition, there is a drawback that most of the hardware is useless.

The switcher 1 is provided with an auxiliary output terminal. The first video data S1 and each type of video data as described above are voluntarily switched and output to the outsides from this auxiliary output terminal. Namely, as shown in FIG. 1, six types of video data (hereinafter referred to as "internal video data") S7 generated in the effects unit 3 is sent to a crosspoint 8 of the output unit 4 through an internal data bus 7 for six channels.

Furthermore, first video data S8 for seven channels which are selected at the crosspoint 2 out of dozens of channels of first video data S1 are sent to the crosspoint 8 via an auxiliary data bus 9. First video data S8 and the internal video data S7 are selected in the crosspoint 8 to be output to the outsides as auxiliary video data S9 for six channels via an output circuit 10 of the output unit 4.

In the crosspoint 2, the auxiliary data bus 9 intersects the first input bus 11 for entering dozens of channels of first video data S1. Also in the crosspoint 2, the auxiliary data bus 9 intersects a reentry data bus 12 for entering reentry video data S10 from the effects unit 3. Each of intersecting points is arranged with switch controlled by the control panel (not shown).

When the number of channel in the auxiliary data bus 9 is increased for each type of video data generated at the effects unit 3, the switch in the crosspoint 2 increases by dozens of channels with the result that the construction of the crosspoint 2 becomes complicated and enlarged. Consequently, there has been a drawback that the enlargement of the construction of the switcher 1 cannot be avoided.

It is often unnecessary to select video data again in which the users determine to take out from internal video data S7 in accordance with the system. Consequently, a method for outputting auxiliary video data S9 by providing the exclusive auxiliary data bus 9 cannot avoid superfluous functions, as described above.

In addition, when inputting dozens of channels of first video data S1, the crosspoint 2 constructs an input unit for one channel to be connected in parallel by dozens of channels. Consequently, when the number of channels of the auxiliary data bus 9 is increased for each type of video data generated at the effects unit 3, there is a drawback that kinds of input unit increases in proportion to the number of channels of the auxiliary data bus 9 with the result that the manufacture becomes complicated.

SUMMARY OF THE INVENTION

In view of the foregoing, an object of the present invention is to provide an input and output signal converter which can send a voluntary internal video signal out of the plurality of internal video signals generated at the image processing unit, to the outsides with a simple construction in addition to video signals normally output to the outsides.

The foregoing object and other objects of the invention have been achieved by the provision of an input and output signal converter 13 for outputting a plurality of video signals S1 and/or S7 selected at a first selection unit (hereinafter referred to as "crosspoint") 8 out of a plurality of external video signal S1 and/or a plurality of internal video signal S7 to the outside, comprising a second selection unit (hereinafter referred to as "selection crosspoint") 15 for selecting voluntary internal video signal S7 to be output to the outside out of the plurality of internal video signals S7.

In addition, in the input and output signal converter 13 having a first selection unit (hereinafter referred to as "crosspoint") 2 for inputting and selecting the plurality of external input video signals S1, an image processing unit (hereinafter referred to as "effects unit") 3 for inputting and processing the external input video signals S1 from the first selection unit 2, and a second selection unit (hereinafter referred to as "crosspoint") 8 for inputting the plurality of external input signals S1 from the first selection unit 2 and the plurality of internal video signals S7 generated in the image processing unit 3 to select either the external input video signal S1 or the internal input video signal S7, and which outputs the plurality of external input video signals S1 and/or the internal video signals S7 selected at the second selection unit 8 to the outsides, a third selection unit (hereinafter referred to as "crosspoint") 15 for inputting a plurality of the internal video signal S7 from the image processing unit 3 to select a voluntary internal video signal S7 to be output to the outsides out of the plurality of internal video signals S7 is provided.

A small-sized third selection unit 15 to which the plurality of internal video signals S7 is input and which selects a voluntary internal video signal S7 to be output to the outsides is provided apart from the second selection unit 8 which selects the plurality of internal video signals S7 and/or the plurality of external input video signals S1 generated in the image processing unit 3, so that a voluntary internal video signal S7 out of the plurality of internal video signals S7 can be transmitted to the outsides with a simple construction in which a large number of switches for selecting the plurality of external input video signals S1 in the first selection unit 2 in addition to video signals S3 and S5 normally output to the outsides are removed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
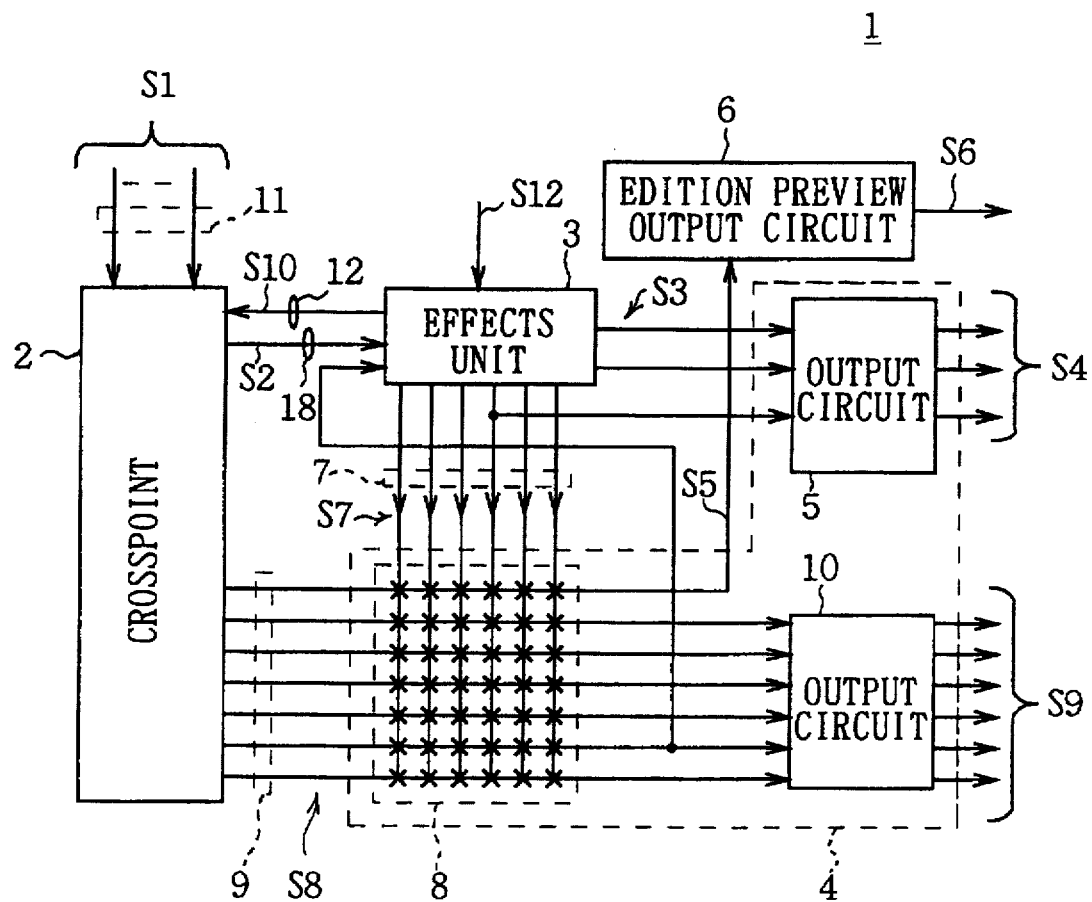
FIG. 1 is a connection view showing a conventional switcher of the input and output signal converter.
Figure 2:
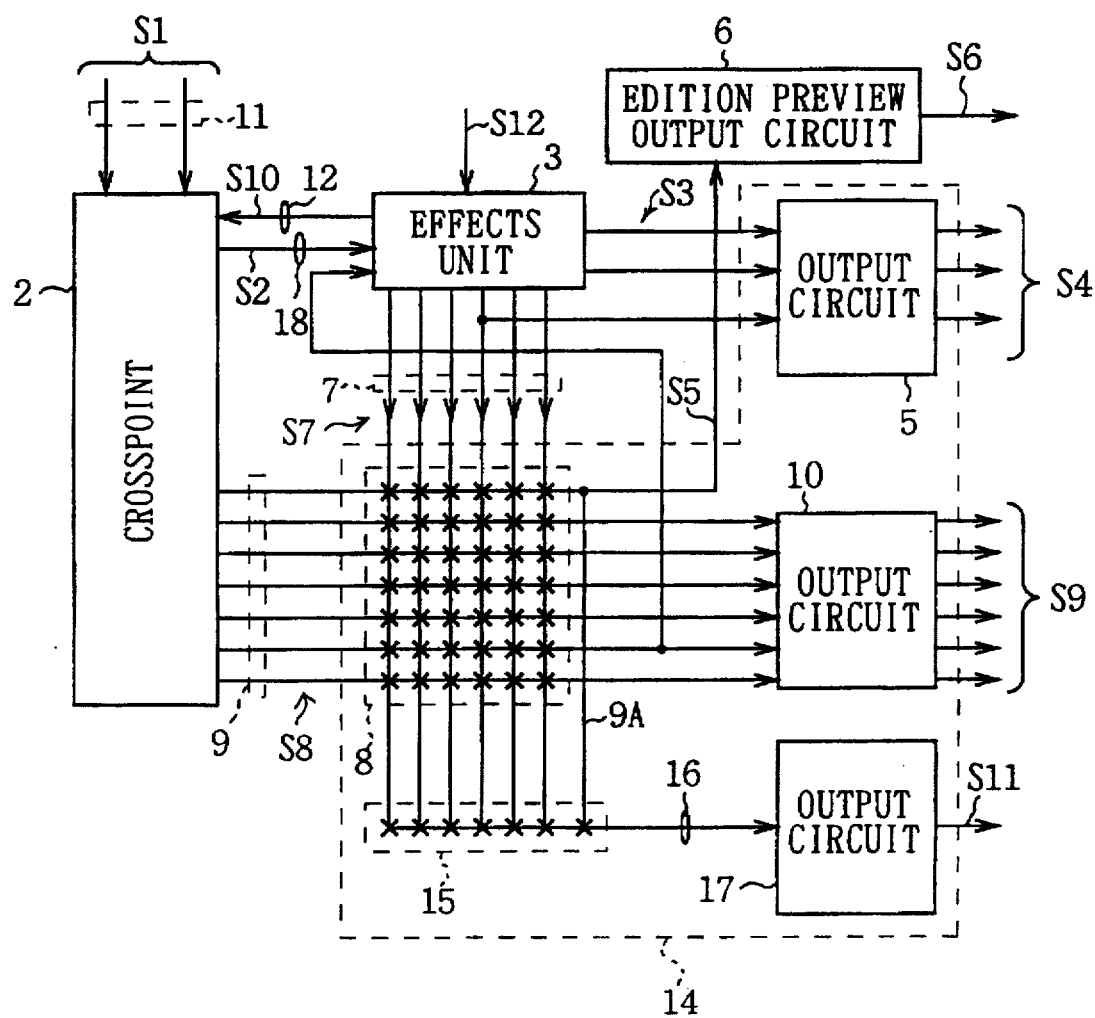
FIG. 2 is a connection view of the switcher according to one embodiment of the input and output signal converter of the present invention.

Preferred embodiments of this invention will be described with reference to the accompanying drawings:

Referring to FIG. 2 giving same numerals to corresponding portions in FIG. 1, 13 shows a switcher as a whole. Dozens of channels of first video data S1 are input from a video camera or a video tape recorder (hereinafter referred to as "VTR") and the like (not shown) via a first input bus 11 to a crosspoint 2. Video data S2 selected by the crosspoint 2 is mixed and given special effects by an effects unit 3 to be output as program data S4 for three channels via an output circuit 5 to the outsides, and to be input as internal video data S7 via an internal data bus 7 to a crosspoint 8.

The switcher 13 is provided with an output unit 14 in place of the output unit 4 in the construction of the conventional switcher 1 shown in FIG. 1. The output unit 14 is provided with a small-sized selection crosspoint 15 on the extension line of the internal data bus 7 of the effects unit 3 in addition to the construction of the conventional output unit 4.

More specifically, a selection data bus 16 for one channel intersects the internal data bus 7 for six channels in the selection crosspoint 15. In addition, the selection data bus 16 intersects branched data bus 9A branched off from the data bus for one channel out of an auxiliary data bus 9. This data bus for one channel transmits edition preview data S5 to an edition preview output circuit 6.

At the intersection points of the selection data bus 16 and the internal data bus 7, the intersection point of the selection data bus 16 and the branched data bus 9A, switches designated by symbol "x" are respectively provided. These switches can be switched by a control panel (not shown). Therefore, the data for one channel out of the internal video data S7 and the edition preview data S5 is output to the outsides as selection video data S11 via an output circuit 17 in the output unit 14.

Figure 3:
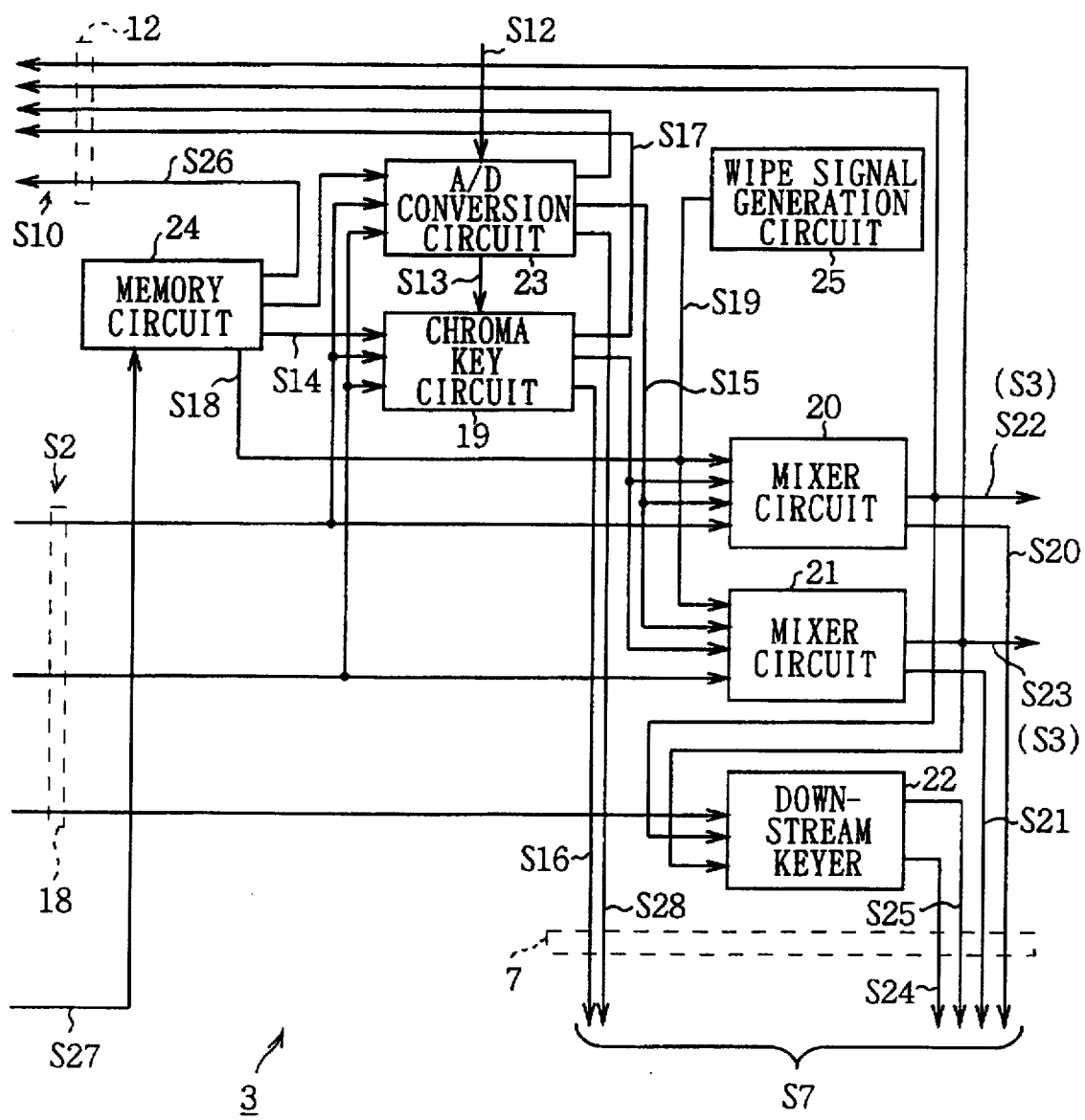
FIG. 3 is a connection view showing a construction of the effects unit thereof.

A plurality of channels of first video data S2 are input into the effects unit 3 via a data bus 18. FIG. 3 shows the effects unit 3. The plurality of channels of first video data S2 input via the bus 18 are given to a chroma key circuit 19, mixer circuits 20 and 21, and downstream keyer 22. Also, an analog video signal S12 is input from the outsides to the effects unit 3. This analog video signal S12 is supplied to an analog-to-digital conversion circuit (hereinafter referred to as "AD conversion circuit") 23 to be converted into digital video signal S13.

In addition to the plurality of channels of first video data S2, the digital video data S13 output from the AD conversion circuit 23 and mask data S14 output from a memory circuit 24 are input into the chroma key circuit 19. Then, the chroma key circuit 19 outputs key data S15 representative of image boundary for chroma key processing, key source data S16 representative of video data S13 in the image boundary, and key fill data S17 replacing key source data S16 in the image boundary with mask data S14. The key source data S16 is output as the internal video data S7 for one channel.

Corresponding to the operation of the users, the mixer circuits 20 and 21 mix the plurality of channels of first video data S2 and respectively generate video data of images which are so combined as to have an image boundary set by the key data S15. In addition, the mixer circuits 20 and 21 set the configuration of the image boundary with wipe data S18 and S19 input from the memory circuit 24 and a wipe signal generation circuit 25 to respectively generate video data of images in which images of the plurality of channels of first video data S2 are switched by enlarging or reducing the image boundary.

The mixer circuits 20 and 21 respectively output edition key, preview data S20 and S21, and key data S15 out of video data generated in the aforementioned processing as the internal video data S7 for two channels. In addition, the mixer circuits 20 and 21 respectively output program data S22 and S23 generated in the aforementioned processing after completion of editing as program data S3 for two channels.

The plurality of channels of first video data S2 and the program data S22 and S23 are input into the downstream keyer 22. Then, preview data S24 and program data S25 in which the program data S22 or S23 is switched are output respectively as the internal video data S7 for two channels.

Frame memory data S26 in the memory circuit 24, key file data S17, and the program data S22 and S23 are sent to the crosspoint 2 as reentry data S10 via the reentry data bus 12 as shown in FIG. 2. Therefore, the reentry video data S10 selected at the crosspoint 2 is processed in the same manner as the first video data S2 at the effects unit 3. Video data S27 input into the memory circuit 24 is sent from one channel of data bus out of auxiliary data bus 9.

On the periphery of the AD conversion circuit 23, input and output wires similar to the wire for the chroma key circuit 19 are arranged. As shown in FIG. 3, when the AD conversion circuit 23 is replaced with a chroma key circuit which is the same as the chroma key circuit 19, key source data S28 similar to key source data S16 is output as the internal video data S7 for one channel.

In the aforementioned construction, the key source data S16, the preview data S24, the program data S25, and the key and preview data S20, S21 are input to the selection crosspoint 15 as the internal video data S7. Furthermore, video data selected at the crosspoint 8 out of these video data is input as the edition preview data S5. In addition, when the AD conversion circuit 23 is used in place of the chroma key circuit, the key source data S28 is also entered into the crosspoint 15.

When the switch of the selection crosspoint 15 is switched by the control panel, for example, program data S25 sent by the downstream keyer 22 can be output to the outsides as the selection video data S11. The program data S25 is actually the same as either program data S22 or S23. By switching the switch by the control panel and passing through the reentry bus 12, the crosspoint 2 and the channel for outputting the edition preview data S5 out of the auxiliary data bus 9, the program data S22 or S23 can be output as the selection video data S11.

Therefore, the number of outputs of program data S22 or S23 to the outsides can be voluntarily increased for one channel without adding an exclusive auxiliary data bus which complicates and enlarges the construction of the crosspoint 2. In the same manner, the number of outputs of other video data to the outsides can be voluntarily increased and output for one channel in place of program data S22 or S23. In addition, it is possible to set one of the output circuits 5 and 17 as analog output and use the other as serial digital output.

In the aforementioned construction, apart from the crosspoint 8 for selecting the internal data S7 for six channels generated in the effects unit 3 and dozens of channels of first video data S1, a small-sized selection crosspoint 15 is provided in which the internal data S7 for six channels is input, and which selects voluntary internal data S7 to be output to the outsides, so that the voluntary video data S7 for one channel out of the internal video data S7 for six channels can be sent to the outsides with a simple construction without numerous switches which selects dozens of channels of first video data S1 in the crosspoint 2, in addition to the program data S3 and the edition preview data S5 normally output to the outsides.

Furthermore, any one channel of the internal data bus 7 can be voluntarily output to the outsides only by adding the selection crosspoint 15, the selection data bus 16, and the output circuit 17 to the conventional construction, so that the number of hardware components such as an output circuit and the like that should be prepared previously can be reduced as a whole, compared with a case of increasing the number of channels of the auxiliary data bus 9 for each internal data S7, and a case of preparing an exclusive output circuit and the like in accordance with a system or its use which is different between users.

Furthermore, it is possible to voluntarily output any of the internal data bus 7 for one channel, thereby the users can construct the system more freely such as outputting the same content with the analog and digital and the like. In addition, it is possible to reduce the number of output circuits as a whole, so that the connectors on the back panel of the box (hereinafter referred to as "BNC connector") can be reduced in number. Consequently, the size of the box can be reduced.

In the aforementioned embodiment, the first video data S1 is input to the crosspoint 2, and the crosspoint 8 and the selection crosspoint 15 are provided in the output unit 14 to output the selection video data S8 for one channel. However, the present invention is not only limited to this, but the analog video signal may be converted to a digital video data and is input to the crosspoint 2, and all crosspoints may be collected into one group to output the selection video data for two or more channels.

Figure 4:
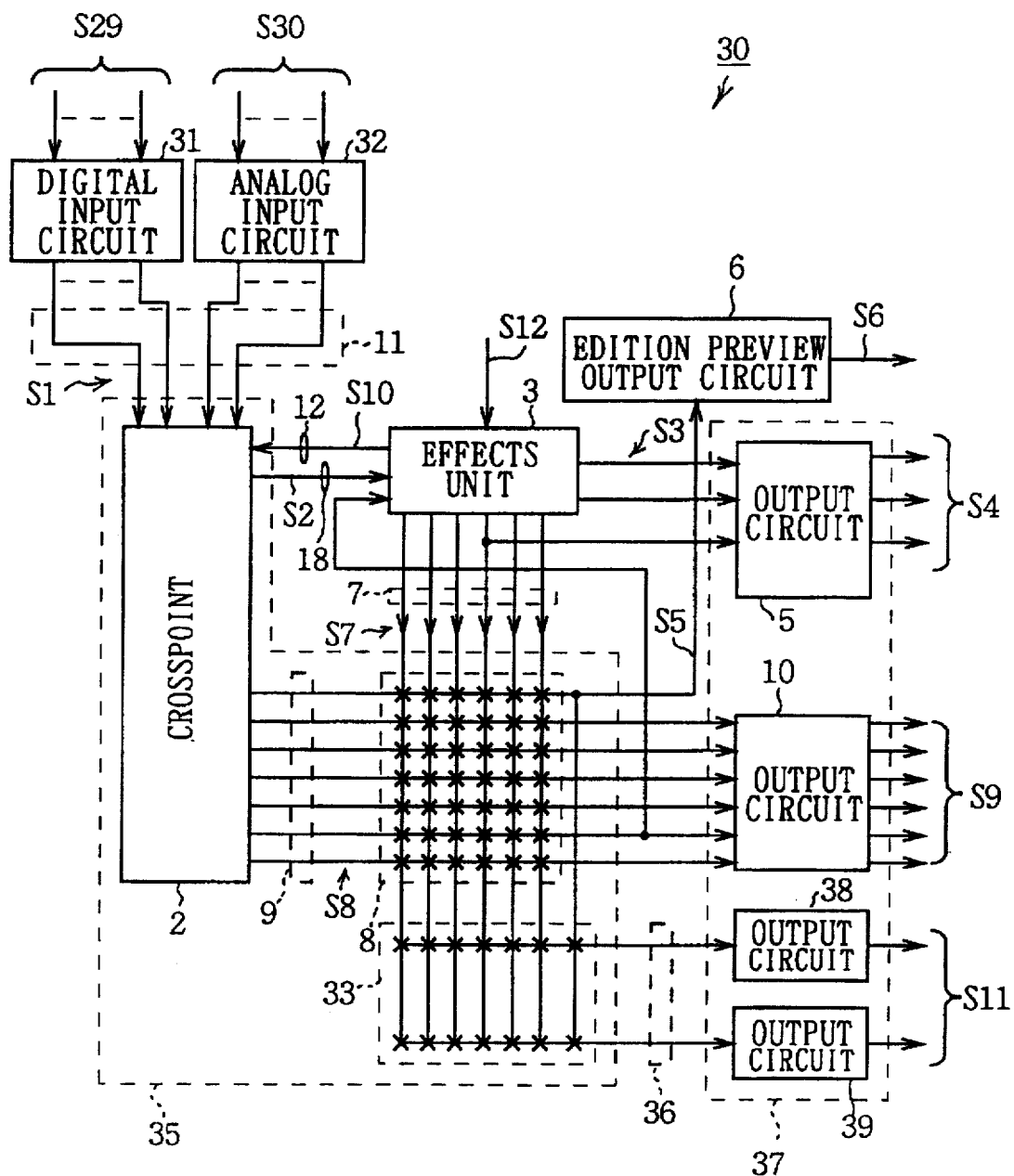
FIG. 4 is a connection view explaining the switcher according to another embodiment.

FIG. 4 shows a switcher 30. A first video data S29 is input to a digital input circuit 31, and input as first video data S1 via the first input bus 11 to the crosspoint 2. In addition, the switcher 30 inputs first video signal S30 into an analog input circuit 32 to convert to a digital signal, and then the analog input circuit 32 outputs it as the first video data S1 via the first input bus 11 to the crosspoint 2.

Furthermore, the switcher 30 has a selection crosspoint 33 for two channels in place of the selection crosspoint 15. The selection crosspoint 33 is provided in a crosspoint unit 35 together with the crosspoints 2 and 8. When the switches designated by symbol "x" of the selection crosspoint 33 are switched by the control panel (not shown), two channels out of the internal video data S7 and the edition preview data S5 are output as the selection video data S11 to the outsides via a selection data bus 36, and output circuits 38 and 39 in an output unit 37.

Therefore, it is possible to voluntarily increase two channels of the program data S3 and the like in the same manner as the aforementioned embodiment. Furthermore, when one of the output circuits 38 and 39 is replaced with an analog output circuit, for example, the content of the program data S3 can be output simultaneously to the outsides both as analog output and serial digital output.

Additionally, in the aforementioned embodiment, the first video data S1 is input to the crosspoint 2 and video data is output from the output circuits 5, 10, and 17, and the edition preview output circuit 6. However, the present invention is not only limited to this, but can be applied to a case in which a crosspoint for analog-to-digital converting is provided in place of the crosspoint 2, a first analog video signal is input to the crosspoint, and the output circuit and the edition preview circuit perform digital-to-analog conversion to the video signal to output an analog video signal.

Furthermore, the embodiment described above, the present invention is applied to the switcher 13 which processes with digital mixing and simple special effects. However, the present invention is not only limited to this, but can be applied to a switcher which processes with analog mixing and simple special effects.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:
1. An input and output signal converter comprising:
    a first selection unit receiving a plurality of external input video signals and selecting at least one of said external input video signals;
    an image processing unit for receiving and processing said external input video signals selected at said first selection unit to generate internal video signals;
    a second selection unit receiving said external input video signals selected at said first selection unit and a plurality of said internal video signals generated in said image processing unit and selecting at least one of said external input video signals or said internal input video signals for external output;
    a third selection unit for receiving a plurality of said internal input video signals from said image processing unit to select at least one of said internal video signals for external output from among said plurality of said internal video signals;

wherein, said third selection unit receives a plurality of said internal video signals via a first group of lines in which a plurality of said internal video signals are input from said image processing unit into said second selection unit and externally outputs said one of said internal video signals via a second group of lines separated from said selection units; and wherein, said third selection unit further receives one of said external input video signals via a third group of lines in which a plurality of said external input video signals are input from said first selection unit to said second selection unit.

2. An input and output signal converter comprising:

a first selection unit receiving a plurality of external input video signals and selecting at least one of said external input video signals;

an image processing unit for receiving and processing said external input video signals selected at said first selection unit to generate internal video signals;

a second selection unit receiving said external input video signals selected at said first selection unit and a plurality of said internal video signals generated in said image processing unit and selecting at least one of said external input video signals or said internal input video signals for external output;

a third selection unit for receiving a plurality of said internal input video signals from said image processing unit to select at least one of said internal video signals for external output from among said plurality of said internal video signals; and wherein, said first selection unit further receives a plurality of said internal video signals from said image processing unit.

* * * * *